Jan. 11, 1966 E. R. SOLYST 3,229,268
DETACHABLE ELECTROMAGNETIC AIR BEARING TRANSDUCER
Filed April 28, 1961 3 Sheets-Sheet 1

INVENTOR.
ERIK R. SOLYST
BY
Carl Fissell Jr.
AGENT

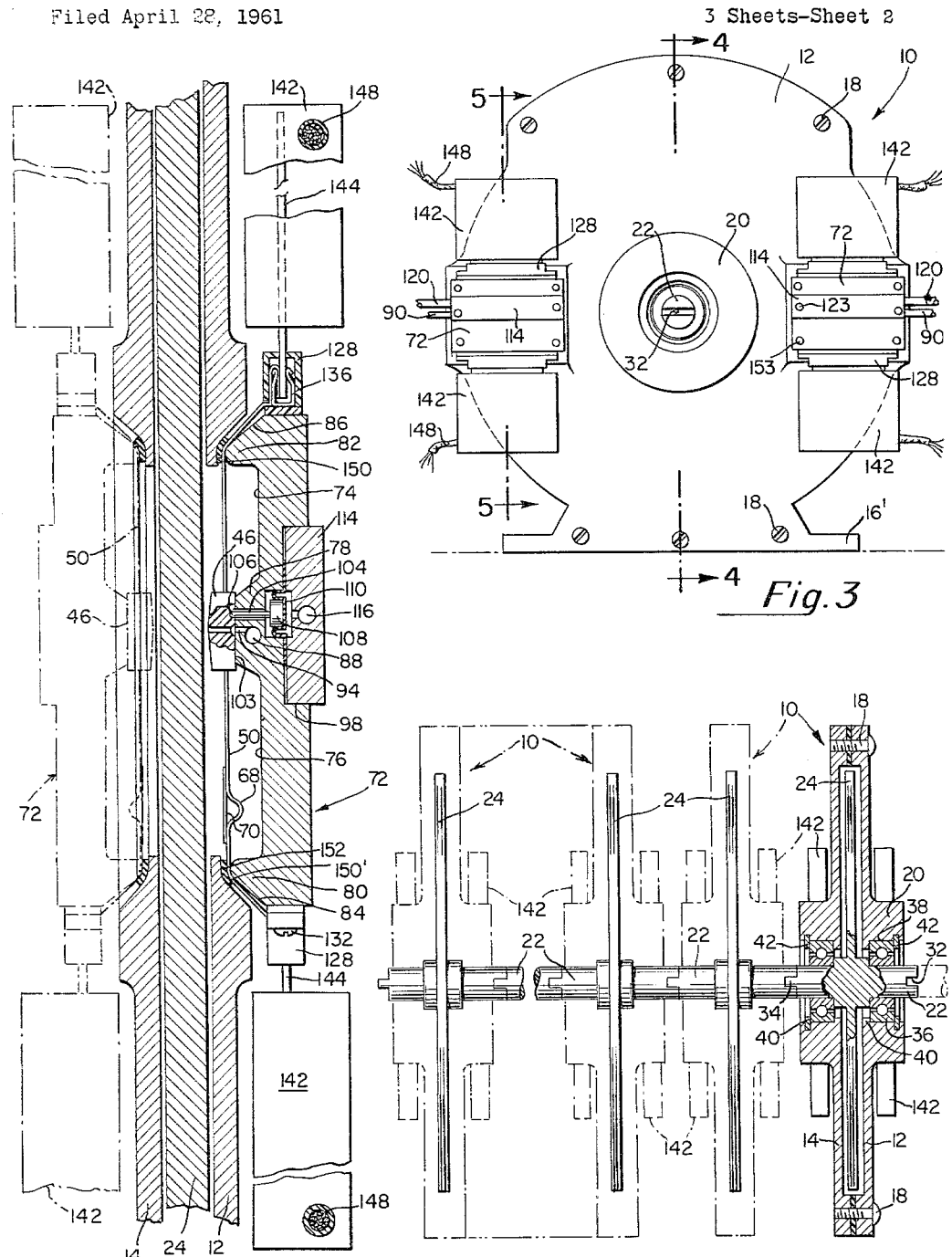

Jan. 11, 1966     E. R. SOLYST     3,229,268
DETACHABLE ELECTROMAGNETIC AIR BEARING TRANSDUCER
Filed April 28, 1961     3 Sheets-Sheet 3
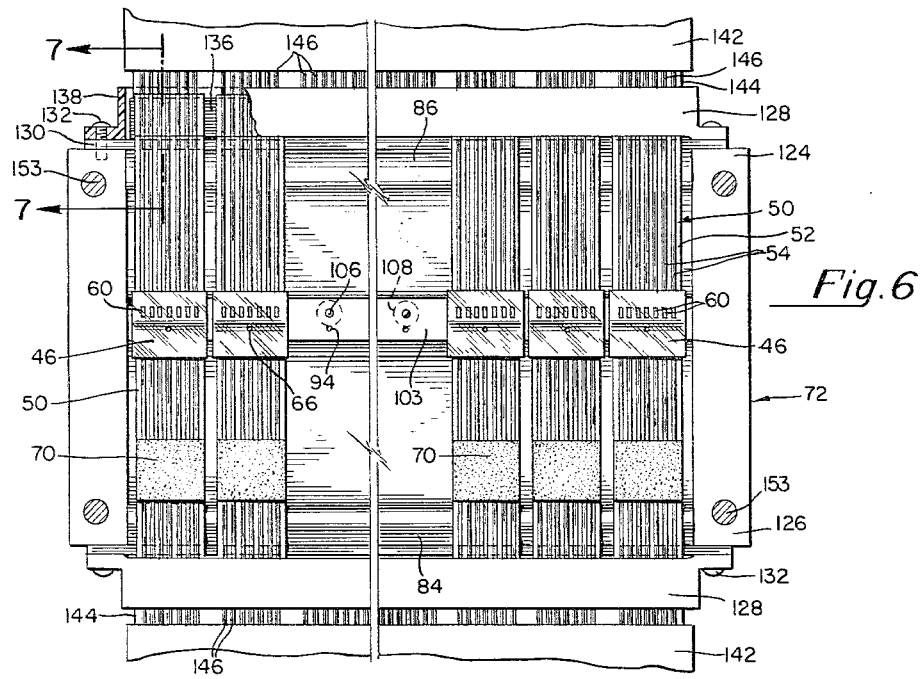
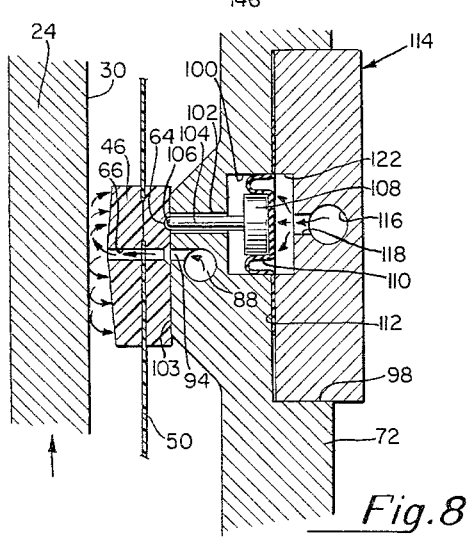
*Fig.8*
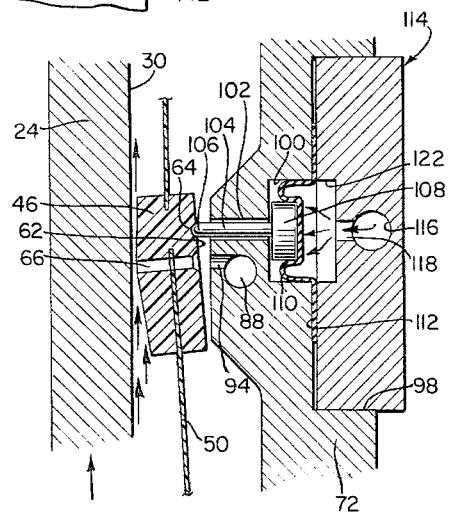
*Fig.9*
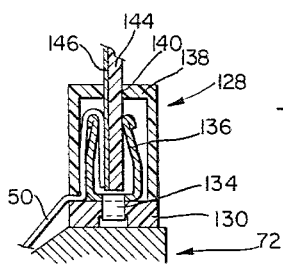
*Fig.7*
INVENTOR.
ERIK R. SOLYST
BY
*Carl Fissell Jr.*
AGENT United States Patent Office 3,229,268
Patented Jan. 11, 1966

3,229,268
DETACHABLE ELECTROMAGNETIC AIR
BEARING TRANSDUCER
Erik R. Solyst, Havertown, Pa., assignor to Burroughs
Corporation, Detroit, Mich., a corporation of Michigan
Filed Apr. 28, 1961, Ser. No. 137,447
6 Claims. (Cl. 340—174.1)

The present invention relates in general to electromagnetic transducer apparatus and more particularly, although not necessarily exclusively, to modular memory apparatus wherein multiple multi-channel electromagnetic transducer are employed to read from or write upon a movable record member. With still more particularity, the present invention concerns itself with such apparatus for enabling reading from or writing upon opposite sides of the same record member, e.g., an electromagnetically magnetizable disc, drum or tape. Another aspect of the present invention is the provision of apparatus which hermetically seals or encloses the record medium and through which a transducer assembly projects into operative relation therewith. Still more specifically, the present invention is concerned with a unitary assembly including one or more multi-channel electromagnetic transducers together with electrical switching devices employed therewith in a demountable, pluggable structure, including means for attaching the transducer (read-write) assembly to the record medium enclosure, whereby the transducers and/or the switching devices may be interchanged, exchanged, repaired and maintained without having to demount the complete assembly. Still further, the invention relates to means for demountably stacking together a plurality of movable record members so that the entire assembly of record members may be driven or rotated from a single source of torque such as an electric driving motor while permitting the disassembly of any one or more of such record members without disturbing or changing the relative position of the other members in the assembly.

In the prior art it is common to provide a magnetic memory unit in the form of a record member for example, whose periphery may be coated with either iron oxide or nickel cobalt. One or more transducers are often spaced from the record periphery by several thousandths of an inch. Such transducers are also usually positioned with respect to the record member over one or more parallel tracks or channels thereon, where the term "track" or "channel" denotes a reference line, e.g., circle on the periphery or surface of the record member which usually passes beneath the transducer associated with that particular track.

Several different forms of magnetic transducers have been found acceptable for use with such magnetic record members. A common form being a horse-shoe shaped core of magnetic material which carries an electrical coil or winding remote from the core gap. The gap in the core is positioned adjacent the associated recording track. In writing signals on the record therefore, energization of the transducer winding creates a magnetic field, at least part of which bridges the core by way of the adjacent record periphery. Conversely, in reading signals from the record member, a portion of the flux produced by the magnetized portion on the record channel bridges through the transducer core and thereby generates an electrical output signal on the associated transducer winding.

The positioning of the transducer adjacent the record member is a time consuming and difficult operation. The transducer must be positioned over the desired track and must be spaced from other transducers on the same track to within a few thousandths of an inch. It must be spaced from the surface of the record within one or two thousandths of an inch. A different and serious disadvantage of prior art magnetic memory structures is that the magnetic record must be precision ground so that its eccentricity or runout is limited to several ten-thousandths of an inch. The reason for this requirement is that eccentricity causes the record surface-to-head spacing to vary as the record is rotated which varies the recording resolution and magnetization, and amplitude modulates the playback signal.

Other limitations of the prior art magnetic memory transducers are that their electrical efficiency is relatively low owing to the fact that a great deal of the magnetic field generated in a recording head is lost through fringing flux, and that their maximum resolution in terms of area density per unit length of record, and for a given signal-to-noise ratio, is relatively low because the magnetic flux which bridges the core gap is effective over a length of the record surface which is considerably larger than the core gap itself. The latter disadvantage is in turn a function of the structure of the prior art heads, and the fact that the heads are normally spaced from the record member. Attempts have been made to avoid some of these limitations through the development of a transducer which would actually ride on the surface of the record. In general these attempts have been unsuccessful, however, since the heads have been constructed with multi-turn coil windings which not only limit their maximum electrical efficiency but, result in a head whose mass is, although in some cases reduced through miniaturization, still relatively large. Consequently, the spring force which would be required to overcome even normal accelerations and keep the head in contact with the record could be sufficiently large to cause the head to erode the magnetizable layer on the record surface. Conversely, if the force is reduced to eliminate this erosion, unacceptable head bounce results.

Air stabilized magnetic transducers have been successfully utilized wherein the transducer operatively floats on a cushion of air adjacent the recording surface. However, failure of the air supply can result in engagement of the record medium by the transducer with concomitant damage to the transducer or the record member or both.

The present invention overcomes these and other difficulties and limitations by providing multi-channel transducer assemblies which require only minor alignment relative to the record medium and which include one or more head elements which are positioned adjacent the record surface by means of a pre-stressed flexible member partaking of a gimbal mounting. The assembly of multi-channel transducers is then sealed in a dust tight enclosure.

It is an important object therefore of the present invention to provide a magnetic memory module construction wherein the associated transducers are automatically alignable with respect to the surface of the recording member.

Another object of the invention is to provide a transducer including a read-write head which will constantly follow the surface of the record member as the latter is moved without contact therewith, thus to eliminate the need for precision machining of magnetic record members.

Still another object of the invention is to provide a compact and light weight magnetic memory module wherein the read-record members are provided with means permitting them to be demountably, operatively, associated together thus to provide ease of maintenance, service and repair.

It is also an object of the present invention to provide a recording head which is air guided, i.e., floats on the surface of the record medium despite displacements due to the eccentricity and non-circular cross section of the record member, e.g., drum, disc, tape etc.

Another object of the invention is to provide an externally pressurized hydrodynamic slider bearing type transducer assembly for use with discs, drums, or tapes.

It is an additional object of this invention to provide apparatus for automatically positioning multi-channel transducer assemblies adjacent opposite sides of the same moving record member by mounting such assemblies in demountable modules which may be pluggably disposed adjacent the surface of the record member and deflectable in response to the air current produced by movement of the record surface relative thereto thereby to position the transducer adjacent the record surface in accurate alignment therewith.

In accordance with the foregoing objects and first briefly described herein, the invention comprises a movable record member enshrouded in a dust tight enclosure having one or more openings therein in one or both sides of the enclosure. An electromagnetic transducer assembly including one or more multi-channel recording transducers is disposed in each opening and is sealed therewithin. The multi-channel transducers are adapted to operate effectively as air floating slider bearings wherein each transducer assembly is movable in a plurality of directions about two substantially perpendicular axes as in a gimbal mounting and is biased by means of air pressure toward the record medium. Air pressure is also used to bias the heads away from the record surface when the unit is started up thus to avoid damage to the record member. Pressurized air is supplied to each transducer through air ducts or manifolds and orifices extending behind each of the heads exiting at the operating surface of each transducer assembly.

Other objects and advantages of the invention will be pointed out in the following description and claims and illustrated in the accompanying drawings which disclose, by way of example, the principal of the invention and the best mode which has been contemplated of applying that principal.

In the drawings:

FIG. 3 is an elevational view of the assembly of FIG. 1;

FIG. 4 is a sectional view along the line 4—4 of FIG. 3;

FIG. 5 is a greatly enlarged sectional view along the line 5—5 of FIG. 3;

FIG. 6 is an enlarged plan view of one of the transducer assemblies for each window opening of FIG. 1;

FIG. 7 is a greatly enlarged sectional view along the line 7—7 of FIG. 6; and,

FIGS. 8 and 9 are greatly enlarged sectional views of the central portion of the transducer head operating mechanism of the present invention illustrated in two of its operating conditions.

Figure 1:
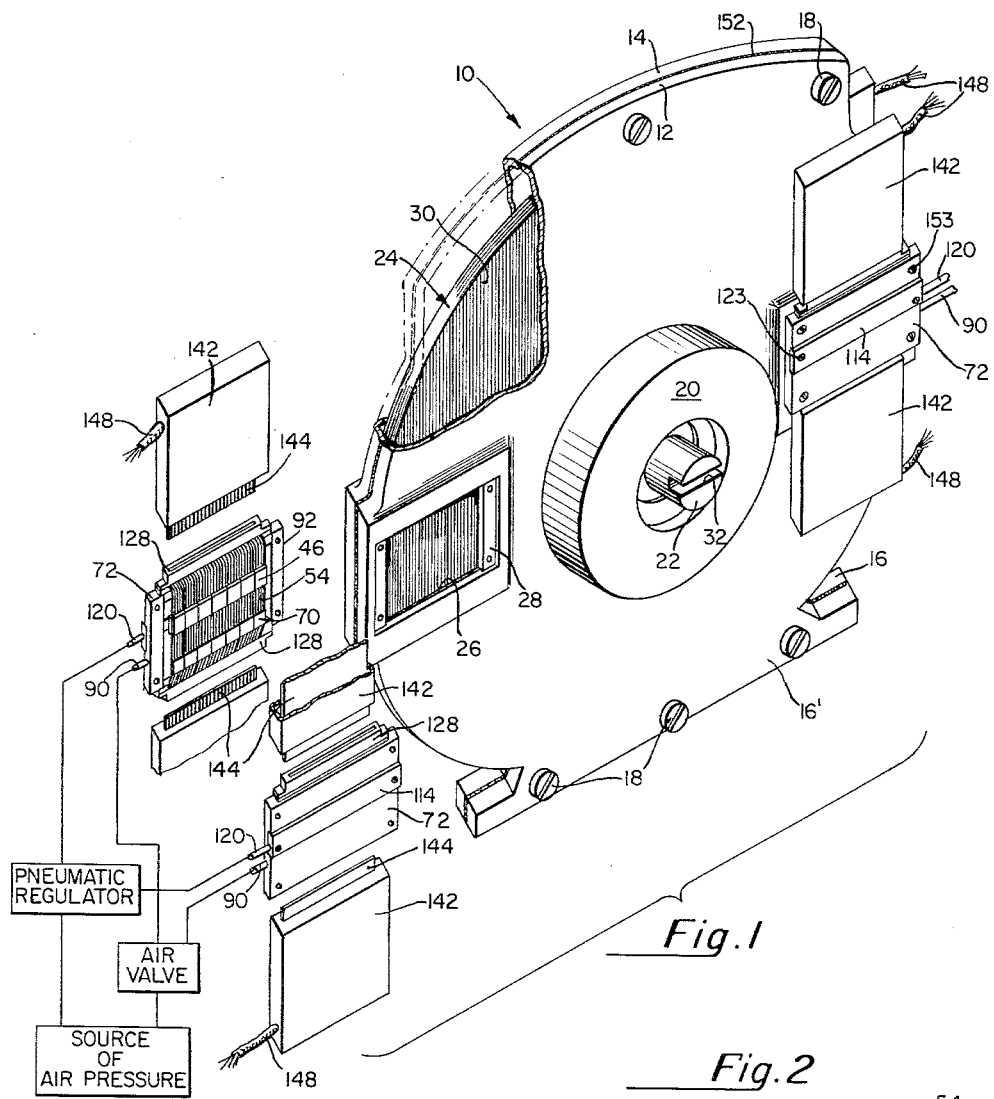
FIG. 1 is an exploded isometric view with parts broken away of a preferred embodiment of the electromagnetic transducer assembly of the present invention.

With reference now to the details of the drawings, wherein like or corresponding parts are designated by the same reference characters throughout the several views, there is shown in FIG. 1 an electromagnetic transducer memory module 10, constructed according to the invention. As seen therein, the module 10 comprises a plurality of demountable sub-assemblies each of which is more or less self-contained and, as will be pointed out more particularly hereinafter, are adapted to be separately detachably and/or pluggably mounted together to form a unitized structure.

The overall modular type assembly generally includes a dust tight enclosure formed by separate front and back cover members 12 and 14 respectively, which are each generally circular in configuration and are fabricated as shallow shell-like structures each having a pedestal-like appendage 16 and 16' respectively, forming a base or support therefore. The two members 12 and 14 are adapted to be joined and fastened together as by bolts 18, FIGS. 3 and 4, disposed adjacent the upper and lower peripheral edges thereof. Each member 12 and 14 is provided with a central hub portion 20, FIGS. 1, 3 and 4, into and through which a drive shaft 22 of a movable record medium 24 projects, for purposes to be explained presently.

One or more openings or apertures 26, only one of which is shown in FIG. 1 may be provided in each member 12 and 14. Each opening 26, in the preferred and illustrated embodiment of the invention may be cut or precast in the members in a known fashion and each is provided with an interior shoulder or ledge 28 extending around the inner perimeter thereof for purposes to be explained later on. The area immediately bordering each opening 26 is raised slightly away from the plane of the remainder of the cover members, as seen most clearly in FIG. 1. The openings in one member 12 are aligned with the openings in the member 16.

Although the record medium 24 is illustrated as a disc, it is to be understood that the invention is equally applicable to recording drums or tapes. The record medium hereinafter referred to as disc 24 is provided in a known manner with a suitable magnetizable surface 30.

Referring more particularly to FIG. 4, it can be seen that the shaft 22 of each disc 24, which may be integral therewith if desired, extends from opposite sides thereof and is provided at one end with a notch or slot 32 therein while the opposite end bears a projecting tab or key 34. The hub portion 20 of each member 12 and 14 houses a bearing member 36 which may be press-fitted into a drilled, milled or otherwise formed opening 38 therein so as to seat against the inner flange or rim 40. The bearing is retained in the hub against accidental dislodgement therefrom by means of a C-ring 42 in a known manner.

As is evident from FIG. 4 of the drawings, the disclosed arrangement permits a plurality of memory module assemblies including the discs 24 to be stacked in side by side, parallel, spaced apart relation. The alignment of the shaft ends one with another, enables the various disc assemblies to be inserted into or removed from the unitary structure without disorienting or interfering with the arrangement of the remaining assemblies, as will appear more clearly hereinafter. While the openings 26 have been shown as rectangular in outline they may of course be of any convenient shape consistent with the shape of the transducer assemblies to be inserted therein. They could, for example, be oval or square.

Figure 2:
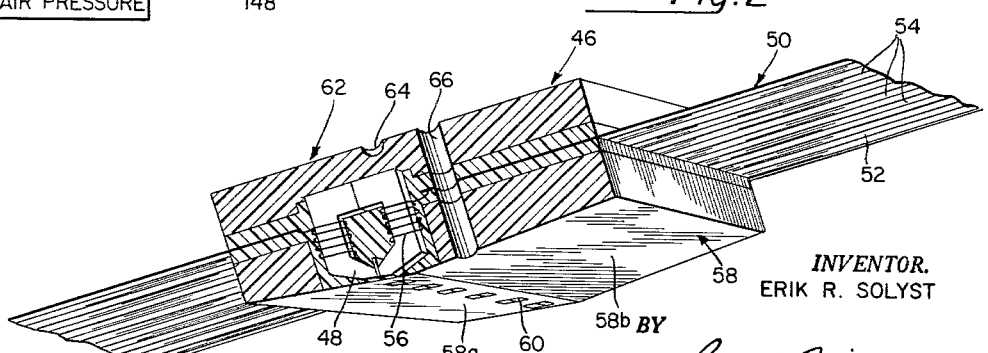
FIG. 2 is a greatly enlarged isometric view of one of the transducer head packages used with the present invention.

Referring to FIG. 2, an electromagnetic transducer 46 according to the invention, is seen to comprise a plurality of recording and reading heads 48 each head preferably having the general form and outline of that which is shown. As earlier mentioned herein, each multi-channel transducer 46 is adapted to operate as an independent slider bearing and to this end, is constructed in a manner providing means permitting it to flex or move in a plurality of directions relatively freely, semi-rigidly about two axes substantially perpendicular or at right angles to one another. Such a transducer construction, modified as hereinafter set forth, is described and claimed in a copending U.S. patent application to Erik Solyst, Serial No. 58,515, filed Sept. 26, 1960, now abandoned, entitled "Electromagnetic Transducer and Method of Fabrication," and assigned to the same assignee as the present invention.

The heads 48 are attached, as described in this application, to a flat planar, flexible, dielectric member 50, one surface 52, of which is provided with a plurality of parallel, spaced apart conductive busses 54 such as printed wiring, for example, extending longitudinally thereof. Energizing windings 56 are connected to respective busses 54 in a known manner for further interconnection into other associated circuitry, as will be described later on.

The lower or operating surface 58 of each transducer is provided with two angularly related flat planar surfaces 58a and 58b intersecting in a line or apex adjacent the row of head gaps 60. The upper surface 62 of the transducer is provided with a spherical recess 64 and a centrally located through hole or orifice 66 extending from one to the other of the surfaces 58 and 62 adjacent the gaps 60, for purposes to be explained presently.

As seen in FIG. 5, and as will be explained presently, the flexible suspension member 50 is transversely crimped adjacent one end, as indicated by reference character 68, and a strip of resilient material such as Neoprene, rubber or other rubber-like plastic material 70 is secured to member 50 at both sides of the crimp so as to constrain the one end of the member 50 in its crimped tensioned condition.

A multi-channel transducer supporting assembly for the present invention is seen, by reference to FIGS. 5 and 6, to comprise a substantially rectangular frame member 72, of suitable rigid non-magnetic material such as aluminum or brass, etc. Frame 72 is provided with a pair of parallel depressions or recesses 74 and 76 separated by a central raised land 78, the recesses 74 and 76 being bounded on opposite sides thereof by ridges 80 and 82 the outwardly facing sides 84 and 86 of which are canted or slanted angularly away therefrom.

A central longitudinal aperture 88 (FIGS. 5, 8, and 9) drilled or otherwise formed therein extends within the land 78 substantially from side to side of the frame 72. A connector member 90, FIG. 1, may be suitably secured to one end of the opening 88 for connection thereto of an air hose or line extending from a source of air under pressure. The opposite end of the aperture 88 may terminate within the frame just short of the edge 92, FIG. 1, thereof.

Disposed at regular intervals along the land 78 are individual apertures 94, FIG. 6, arranged at right angles to and opening into the orifice 88 for purposes which will become more apparent as the description proceeds. The outer face 96 of the frame is provided with an enlarged, substantially centrally disposed groove or recess 98 formed therein in a known manner as by casting, milling, cutting, etc. and extending from side to side of the frame adjacent the land 78.

A plurality of enlarged openings 100 are located along the base of the recess 98 at regular intervals in much the same manner as the openings 94. A narrow elongated constricted bore 102, FIG. 5, connects each opening 100 with the flat surface 103 of the land 78. A plunger 104 is adapted to be reciprocably, slidably, movable within each bore 102. The rounded end 106 of the plunger projects slightly beyond the surface 103 of the land 78 and is adapted to be received in the spherical depression 64 in the surface 62 of each transducer 46, FIGS. 7 and 8. The opposite end of the plunger carries an enlarged cap member 108 secured to or integral therewith.

Attached to the member 108 as by gluing or other similar means is a flexible diaphragm 110 which is secured at its outer peripheral edges to the rim 112 of each opening 100 as by bonding or otherwise in a known manner.

An elongated rectangular, rigid bar-like member 114 having a main longitudinal opening 116 extending substantially from end to end thereof is provided with a plurality of spaced apart perpendicular orifices 118 interconnecting with the main opening 116, FIGS. 8 and 9. As seen in FIG. 1, a hose connection 120 may be fixed to the open end of the main opening 116 while the opposite end thereof may terminate a short distance ahead of the opposite end 92 of frame 72. Individual circular openings 122 are axially aligned with openings 118 and with the openings 100 in frame 72 and interconnect the main orifice 116 therewith for purposes to be explained later on. Member 114 is attached to the frame 72 as by bolts 123.

With respect to the land 78, it may be seen that there are as many orifices 94 and 102, FIG. 6, as there may be transducers 46. Each orifice 94 is axially aligned with a respective orifice 66 in a transducer. As shown more particularly in FIGS. 1 and 6, seven transducers are illustrated for which seven orifices 94 are provided. However, as evidenced by the break lines in FIG. 6, the transducer supporting frame 72 is capable of utilizing any reasonable number of transducer assemblies. The size of the frame 72 is thus more or less dependent upon the specific structure with which the transducers are to be employed as well as upon the size of the recording transducer employed therewith.

In FIGS. 5, 6 and 7 it is seen that each opposite end 124, and 126, respectively, of frame 72 is provided with an electrical connector member 128 constructed substantially as shown in detail in FIG. 7. Each connector 128 includes a base member 130, each end of which has a hole for reception therethrough of a bolt 132. Secured to the base 130, as for example, by a band 134, is a double row of vertically projecting, parallel, spaced apart tines 136. A cap or cover member 138, having a longitudinal slot forming an access hole or opening 140 therein, is adapted to be press-fitted onto the base 130, in a manner and for purposes to be explained hereinafter.

In order to facilitate the efficient and compact modularization, as herein described, the present invention also provides means for detachably mounting certain switching circuitry including diodes and gates to the transducer assemblies. To this end, a pluggable container 142, FIG. 1, includes a printed wiring board 144 having conductive busses 146 thereon, and a cable 148 extending therefrom for electrical interconnection of the switching circuitry to other associated electrical and mechanical apparatus such for example as a computer. By means of the aperture 140 aforementioned, the circuit busses 146 of the printed boards 144 may be detachably pluggably electrically connected to the coils 56 of the transducers 46.

In mounting each transducer 46 to the frame 72 the transducer is disposed over the surface 103 of the land 78, FIG. 5, with its opposite ends 150 and 150' arched over the rounded surfaces of the ridges 80 and 82. Each end 150 and 150' is then placed in tension against the bias of resilient member 70 by looping a terminal portion thereof over the rows of tines 136 of connector 128 and bending the same back upon itself in U-shaped configuration FIG. 7, after which the cover portion 138 is press-fitted to the base 130 causing the conductors 54 to be tightly pressed against but insulated from the tines 136.

The land 78 may, if desired, be slightly higher in extent than the ridges 80 and 82 so that the ends 150 and 150' of member 50 may be angularly slanted slightly away from the land 78 thus to increase the tension on the transducer when the ends 150 and 150' are secured in their respective connectors.

Once the desired or required number of transducers 46 have been adjustably secured to the frame 72, in the manner hereinbefore set forth, the frame is placed within the rectangular opening 26 of a respective member 12 and/or 14 and is pressed onto the flange 28 against a flexible seal 152 of rubber, plastic or other similar material disposed therebetween and surrounding the perimeter of each of the openings. The seal prevents the ingress of dust, dirt and other foreign matter which might abraid the disc surface. Belts 153 secure the frame 72 within these respective openings 26. Panels 144 carrying conductors 146 are thereafter introduced into respective connectors 128 with their printed wiring busses 146 electrically engaging the conductors 54 of each transducer 46. Although the panel shown in FIG. 7 is illustrated with a conductive pattern on only one side, it is quite apparent from the foregoing that the printed panel may bear conductive patterns on both sides thereof in which case the connector 128 could have its tines electrically insulated from one another.

Referring now to FIGS. 8 and 9, which illustrate by way of example two of the operational modes, phases or conditions of the present invention when in use, it can be seen that the plunger 104 is receivable within recess 64 and engages the transducer 46 at a point offset from the aperture 66 and, as will be brought out presently, aids the transducer structure in operating as an air lubricated self-acting slider bearing, i.e., flying relative to the disc 24 in hydrodynamic state as described in the earlier mentioned Erik Solyst application, Serial No. 58,515.

The arrangement of the recording transducer relative to the disc surface is such that in the starting phase or condition, FIG. 8, the transducer is biased under tension of the member 70 away from the disc surface thus to avoid accidental contact with the damage to the disc.

In a preferred operation mode and with the disc 24 at rest, the air valve FIG. 1, is opened permitting compressed air from the air source to flow through connector 90 into and through the orifice 88 whence it pases through connecting orifices 94 into and through orifices 66 in each transducer 46 to exit against the surface of each associated disc 24 creating a back flow of air resulting in a lifting force which effectively prevents each transducer from contacting the surface 30 of the associated disc. The pneumatic regulator is opened to cause air under pressure to flow to connector 128 and through orifice 116, through the connecting orifices 118 into the circular chamber formed between the diaphragm 110 and the opening 122. The pressure build-up thus developed moves the plunger 104 partially out of the bore 102 so that its end 106 engages the spherical depression 64 moving each transducer 46 in the direction of the disc surface 30 against the tension of the resilient material 70 distending the crimped portion 68 of this member. Discs 24 are now rotated. Thereafter as each recording disc attains its operating speed an air wedge due to the relative movement between the disc and the transducer lifts each transducer away from the surface of the disc whereby the transducer effectively "flies" at a predetermined height therefrom. At this time the compressed air to the orifice 90 is shut-off and the hydrodynamic air bearing effect takes over. In this condition the transducer flies in close proximity to the disc or recording member without touching the same. Should the air pressure fail for some unforeseen reason or should the hydrodynamic bearing effect be accidentally nullified the transducers are automatically prevented from contacting the disc surface by the tension of the member 70 which causes each transducer to retract back against the surface of the land 78. In addition to the built in failsafe feature provided by the resilient tensioning member 70, when it is desired to "shut down" the system and stop the rotation of the discs, the air valve in the line to orifice 90 is opened whereupon compressed air is once more forced through each transducer against the disc surfaces thereby preventing the transducers from accidentally contacting the discs. Actual flying gaps of, for example, 100 microinches have been attained with the foregoing arrangement.

What is claimed is:

1. A demountable electromagnetic memory storage module comprising:
    (a) an electromagnetic transducer including one or more read-write heads,
    (b) means for supporting said transducer adjacent to and in operative relationship relative to a movable record member,
    (c) said transducer supporting means including an elongated, flexible, dielectric member attached at its opposite ends to said supporting means permitting said transducer to undulate relative to said record member in a plurality of directions about a pair of axes substantially at right angles to one another,
    (d) electrical circuit means mounted integrally with said flexible member and operably associated with respective read-write heads,
    (e) biasing means for said transducer, including means biasing said transducer toward the surface of said record member and means biasing said transducer out of contact with said record member,
    (f) said transducer including a surface portion thereof angularly positionable with respect to the surface of said record member in response to actuation of said biasing means whereby said transducer is juxtapositioned relative to said record member upon an hydrodynamic cushion of air generated between the transducer and the surface of said record member upon relative movement therebetween, and
    (g) electrical circuit connector means operably demountably attached at opposite ends of said dielectric member interconnecting the read-write heads of said transducer with a utilization device with which the same may be associated.

2. Demountable electromagnetic memory storage apparatus comprising:
    (a) an electromagnetic transducer including one or more read-write heads,
    (b) means supporting said transducer adjacent to and in operative relationship with a movable record member,
    (c) said transducer supporting means including an elongated, thin, flexible, dielectric strip to which said transducer is attached permitting the same to undulate over said record member, in a plurality of directions about a pair of axes substantially at right angles to one another,
    (d) said flexible member being provided with a plurality of spaced, parallel electrical conductors integrally mounted therewith,
    (e) pairs of said conductors being connected to respective read-write heads,
    (f) first air pressure means biasing said transducer toward the surface of said record member,
    (g) second air pressure means biasing said transducer away from said record member,
    (h) means operably associated with said first air pressure means effective to maintain said transducer at a desired position with respect to the surface of said record member once said transducer is caused to float upon an hydrodynamic cushion of air generated between the transducer and the surface of said record member upon relative movement therebetween, and
    (i) electrical circuit connector means operably, demountably attached at opposite ends of said dielectric member interconnecting the read-write heads of said transducer with a utilization device with which the same may be associated.

3. Demountable electromagnetic memory storage apparatus comprising:
    (a) a mounting frame including oppositely disposed ridge portions and an intermediate centrally disposed land portion thereon,
    (b) an elongate, flexible, dielectric supporting member extending between said ridge portions spanning said land portion and being provided with one or more electrical conductors mounted integrally thereon,
    (c) a transducer assembly including one or more read-write heads thereon carried by said supporting member intermediate its ends and disposed adjacent to said central land portion, each head being electrically connected to respective conductors for electrical energization thereof,
    (d) means disposed at opposite ends of said flexible member for demountably interconnecting the same to a utilization device with which said member may be associated, (e) first air pressure means biasing said transducer assembly toward the surface of an associated record member,
(f) second air pressure means preventing said transducer from contacting said record member, and
(g) means for demountably securing said mounting frame in operative relationship to a record member so that relative movement between said record member and said transducer causes said transducer to float upon an hydrodynamic air film thus generated so that upon application of suitable energizing potentials concurrently with movement of said record member information may be recorded upon and read from the same.

4. Demountable electromagnetic memory storage apparatus comprising:
   (a) means mounting one or more electromagnetic transducers adjacent to a movable record member, each transducer including one or more read-record heads,
   (b) said mounting means being provided with parallel oppositely disposed ridges and a central raised land intermediate said ridges,
   (c) a pair of mannfolds extending through said mounting means arranged in parallel spaced apart relation with orifices disposed at intervals therealong and opening outwardly at right angles from said manifolds,
   (d) means for connecting each of said manifolds to a pressure source,
   (e) electrical connector means disposed adjacent each of said ridges,
   (f) flexible, strip-like, dielectric means with electrical conductor means mounted integrally thereon extending between said ridges and spanning said raised land supporting each transducer adjacent to an orifice in said mounting means,
   (g) the ends of said flexible supporting means extending over said ridges and being secured at opposite ends thereof to respective demountable electrical connector means, and
   (h) means operably associated with each transducer for applying pressure thereto so as to bias said transducers in a direction away from said recording means until said transducer is floated upon an hydrodynamic film of air generated as a result of relative movement between said record member and said transducer.

5. A demountable electromagnetic transducer memory storage module comprising:
   (a) a rotatable disc-like record member having oppositely disposed magnetizable surfaces thereon,
   (b) means operably associated with said record member for interfitting said record member with other similar record members for conjoint rotation thereof,
   (c) an enclosure for said record member adapted to seal the same from the atmosphere and being provided with oppositely disposed aligned openings therein,
   (d) a resilient sealing means in each of said openings,
   (e) a transducer supporting frame disposed in each of said openings,
   (f) each transducer frame mounting a plurality of electromagnetic transducers, each of said transducers being supported thereon by means of a resilient, dielectric suspension member with electrical conductor means mounted integrally therewith stretched across said opening permitting said transducer to flex about two substantially perpendicular axes for operation substantially normal and contiguous to said record surface,
   (g) demountable connector means at opposite ends of said resilient suspension for connecting said transducers to a source of signal potential,
   (h) detachably engageable electrical connector means disposed at opposite ends of said frame providing means for applying energizing potentials to said transducers,
   (i) means biasing said transducers toward said record member surfaces, and
   (j) means effectively biasing said transducers away from said record member until said transducers are floating upon an hydrodynamic cushion of air developed between the disc surfaces and said transducers upon relative movement therebetween.

6. Electromagnetic transducer memory module apparatus comprising:
   (a) a movable record member,
   (b) an enclosure for said record member having a plurality of openings therein,
   (c) a plurality of electromagnetic transducers, each transducer including a plurality of read-write heads,
   (d) each of said transducers being supported by means of a resilient dielectric suspension member having electrical conductor means mounted integrally thereon,
   (e) a transducer mounting frame for each of said openings in said enclosure,
   (f) each transducer mounting frame having a first and a second manifold therein and including a first plurality of orifices disposed at right angles to and connected with said first manifold,
   (g) a second plurality of orifices adjacent and parallel to said first orifices and connected to said second manifold at right angles thereto,
   (h) a source of air under pressure,
   (i) means connecting said air pressure source to said first and second manifolds,
   (j) plunger means slidable in each of said first orifices and engageable with a respective one of said transducers,
   (k) means operatively associated with each of said plunger means and responsive to the pressure differential for moving said plungers within their respective orifices as the pressure is varied on one or the other side thereof, and
   (l) means controlling the application of said air pressure to said manifolds whereby when said pressure is applied to said first manifold said transducer moves toward said record member after which said air pressure is applied to said second manifold biasing said transducer away from said record member until said transducer is flying on an hydrodynamic film of air generated between said record member and said transducer due to relative movement therebetween thus to prevent said transducer from contacting said record member.

References Cited by the Examiner

UNITED STATES PATENTS

| 2,991,460 | 7/1961 | Hill | 340—174.1 |
|---|---|---|---|
| 3,148,248 | 9/1964 | Johnson. | |

FOREIGN PATENTS

| 232,539 | 2/1961 | Australia. |
|---|---|---|
| 793,237 | 4/1958 | Great Britain. |

IRVING L. SRAGOW, *Primary Examiner.*